(12) United States Patent
Lam

(10) Patent No.: US 6,375,210 B1
(45) Date of Patent: Apr. 23, 2002

(54) HEAD TUBE JUNCTION ON A BICYCLE

(75) Inventor: Duhane Lam, Vancouver (CA)

(73) Assignee: Rocky Mountain Bicycles, a division of Procycle Group Inc., Quebec (CA)

( * ) Notice: Subject to any disclaimer, the term of this patent is extended or adjusted under 35 U.S.C. 154(b) by 0 days.

(21) Appl. No.: 09/567,213

(22) Filed: May 9, 2000

Related U.S. Application Data

(60) Provisional application No. 60/133,796, filed on May 11, 1999.

(51) Int. Cl.$^7$ .............................................. B62K 19/02
(52) U.S. Cl. ..................... 280/281.1; 280/279
(58) Field of Search ............................ 280/274, 279, 280/280, 281.1

(56) References Cited

U.S. PATENT DOCUMENTS 5,249,818 A * 10/1993 Patterson ................. 280/281.1
5,255,932 A * 10/1993 Moore ..................... 280/281.1

* cited by examiner

*Primary Examiner*—Kevin Hurley
(74) *Attorney, Agent, or Firm*—Swabey Ogilvy Renault

(57) ABSTRACT

A junction for the head tube of a bicycle frame with top tube and down tube members is fabricated in such a way that the top tube and down tube members are jointed. The method of mitering the top tube and down tube members to form the requested joint is cutting off a portion of walls of both the top tube and down tube members at the head ends to form a miter joint. The method of mitering provides for optimum contact area and ease of manufacturing, especially for tubes with non-traditional cross-sectional shapes.

16 Claims, 3 Drawing Sheets

HEAD TUBE JUNCTION ON A BICYCLE

This application claims benefit of provisional No. 60/133,796 filed May 11, 1999.

FIELD OF THE INVENTION

The present invention relates to a bicycle frame, particularly to a method of constructing a head tube junction of a bicycle frame which has a top tube and down tube jointed together at the head tube junction end.

BACKGROUND OF THE INVENTION

Bicycles with frames fabricated from aluminium tubing have become increasingly popular. Unlike steel, aluminium cannot be brazed, so that joints between the tubes of most aluminium bicycle frames have to be welded. The joints between the tubes of the frame usually involve welding of each wall of one tube, ordinarily an edge at the end of the tube, to the surface of the wall of another tube. A critical joint in the manufacture of modern bicycle frames is the joint between the head tube, the top tube, and the down tube. The fork acts as a long lever arm and can exert significant amounts of stress on the head tube junction. The arrival of suspension bikes in the market place with stiff long-travel suspension forks have made the design of this junction even more critical.

Top tubes and down tubes have been getting bigger to achieve greater strength. At the same time, head tubes have been getting shorter to allow for the increased length of front suspension forks. The result is that many frames have top tubes and down tubes that overlap. In the prior art, the top or down tube is mitered to the head tube using hole saws and special fixtures to set up a drill press to position the tube for forming the edge cut. For example, the down tube has a certain diameter and forms a certain angle with the head tube. To make the end cut in the down tube for the welded joint with the head tube, the hole saw having a diameter equal to the diameter of the head tube is installed in a drill press, and the down tube is held in a fixture so that the axis of the hole saw is at the same angle to the down tube as the head tube is in the completed frame. The top tube is mitered to the head tube in the same manner.

The bicycle frames with overlapping down tubes and top tubes are traditionally constructed such that one of the top tube and down tube is mitered to the head tube only, and the other of the top tube and down tube is mitered to both the head tube and the one tube. This method of manufacture is limited to top tubes and down tubes with simple cross-sectional shapes. For example, when both the top tubes and down tubes are cylindrical, a portion of the wall of the top tube can be cut by a hole saw having a diameter equal to the diameter of the down tube at the same angle to the top tube as the down tube is in the completed frame.

However, the traditional method of mitering one of the top and down tubes to form the requested overlapping is impractical for tubes with non-round cross-sections. The welder is either left with a large gap to fill or else the miter itself is extremely complicated. As an example, U.S. Pat. No. 5,249,818, issued to Patterson on Oct. 5, 1993, describes a method of making a bicycle frame having the top and the down tubes overlapping at the head tube junction ends. A notch in the wall of the down tube is shaped to conform to and abut a portion of the surface of the wall of the top tube, and in the finished joint the weld is formed around the juncture between the notch and the wall portion of the tube that the notch abuts. The notch and other cut edges of the tubes are made by a cutting beam such as a laser beam. Relative movement is provided between the beam and the tube being cut such that the beam transverses a predetermined path over the wall of the tube and makes the desired cut. The relative movement includes a rotation of the tube about its axis and a simultaneous movement of the beam axially relative to the tube. This type of cutting process needs either expensive equipment if the cutting process is automatically completed or skillful operators if the cutting process is done manually.

Therefore, there is a need for a method of constructing a head tube conjunction of a bicycle frame which provides for optimum contact area and ease of manufacturing, especially for tubes with non-traditional cross-sectional shapes.

SUMMARY OF THE INVENTION

An object of the present invention is to provide a method of constructing a head tube junction of a bicycle frame which provides optimum contact area and ease of manufacturing, especially with tubes of non-traditional cross-sectional shapes.

Another object of the present invention is to provide a bicycle frame having a head tube junction with increased strength.

In accordance with one aspect of the present invention, there is a bicycle frame provided, comprising at least a head tube, a top tube, a down tube and a head tube junction formed therebetween. The top tube has one end cut at a first predetermined angle with respect to a longitudinal axis of the top tube. The end cut has an edge conforming to and abutting a portion of an external periphery of a wall of the head tube, whereby the top tube is mitered to the head tube at the first predetermined angle. Similarly, the down tube has one end cut at a second predetermined angle with respect to a longitudinal axis of the down tube. The cut end has an edge conforming to and abutting a portion of the external periphery of the wall of the head tube; thereby the down tube is mitered to the head tube at the second predetermined angle. An abutting surface is formed by cutting a portion of the wall of the top tube at the cut end thereof, and another abutting surface is formed by cutting a portion of the wall of the down tube at the cutting end thereof so that the abutting surfaces of the top and down tubes mate to form the head tube junction.

The head tube is preferably cylindrical, and each of the top and down tubes preferably tapers from a round cross-sectional shape to a rectangular cross-sectional shape at the end which forms the junction.

In accordance with another aspect of the present invention, a method is provided for constructing a head tube junction of a bicycle frame including at least one head tube, a top tube, and a down tube. The method comprises steps of cutting one end of the top and down tubes. The one end of the top tube is cut at a first predetermined angle with respect to a longitudinal axis of the top tube so that the top tube is enabled to be mitered to the head tube at the first predetermined angle. The one end of the down tube is cut at a second predetermined angle with respect to the longitudinal axis of the down tube so that the down tube is enabled to be mitered to the head tube at the second predetermined angle. The method comprises further steps of cutting a portion of the wall of the top tube at the cut end thereof to form an abutting surface, and cutting a portion of the wall of the down tube at the cut end thereof to form a mating abutting surface. Finally, the head tube junction is completed by welding at interfaces between the wall of the head tube and the respective cut ends of the top and down tubes, and between the abutting surfaces of the top and down tubes.

The portion of the wall of the top tube and down tube is preferably cut along a straight line at an angle with respect to the longitudinal axis of the respective top and down tubes.

By mitering the top tube and the down tube to each other, a number of benefits can be realized. The bicycle frame constructed in this manner has an increased strength because the jointed top tube and down tube sections act as a built-in gusset to greatly stiffen the head tube junction. The increased strength also results from the perfect contact between the top tube and the down tube through the entire length of the weld. The miter is greatly simplified and can in one form be accomplished with a straight cut and, therefore, the fit up for manufacturing is simpler than those used in the prior art. The weld between the top tube and down tube is at a preferred orientation, and the resulting joint is more aesthetically pleasing. Other advantages of the invention will be better understood with the description of a preferred embodiment.

BRIEF DESCRIPTION OF THE DRAWINGS

Having thus generally described the nature of the invention, reference will now be made to the accompanying drawings, showing by way of illustration a preferred embodiment thereof, and in which.

DETAILED DESCRIPTION OF THE PREFERRED EMBODIMENT

Figure 1:
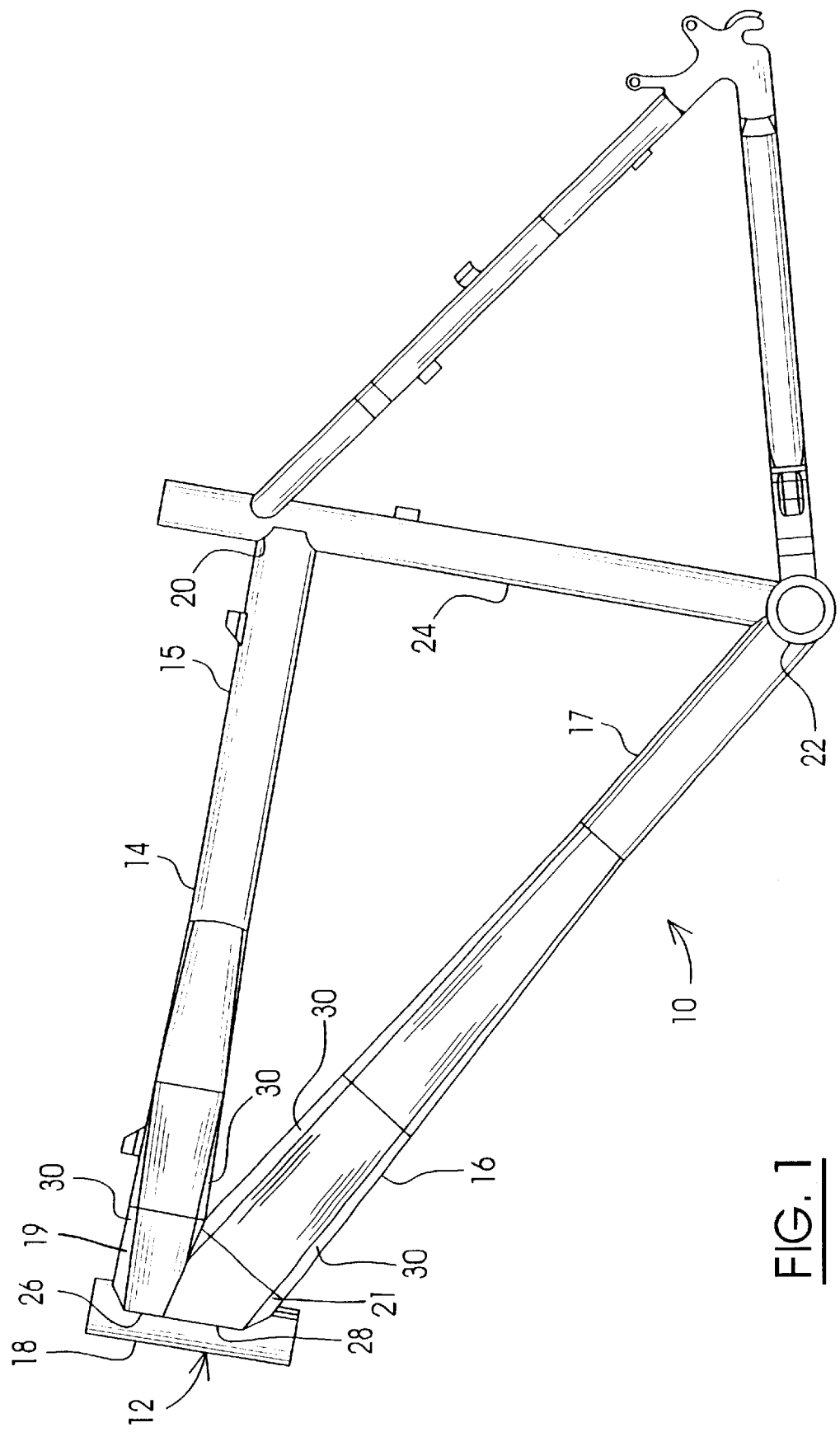
FIG. 1 is a side elevational view of a bicycle frame incorporating the present invention.
Figure 2:
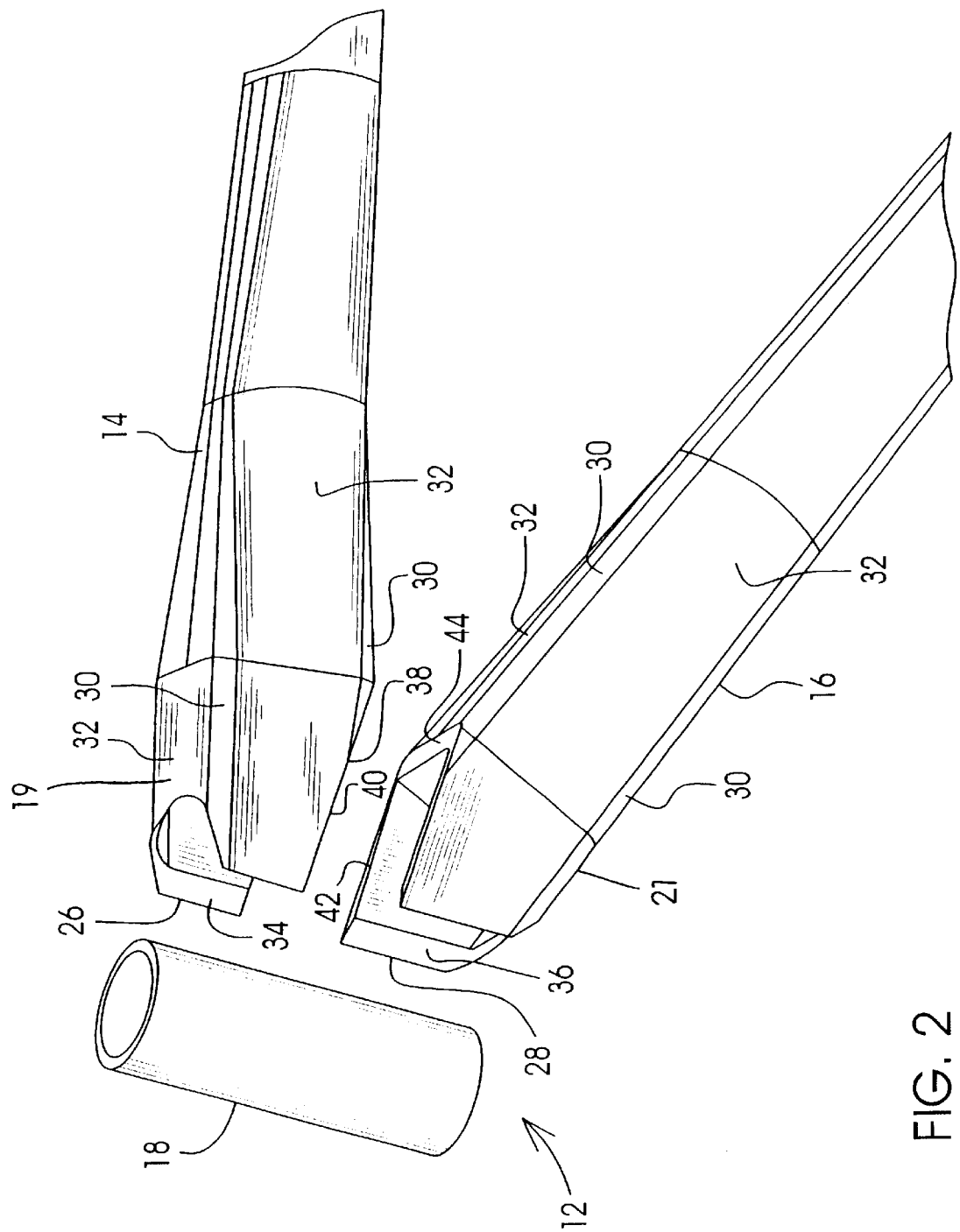
FIG. 2 is a perspective exploded view of the head tube junction showing the miters between the head tube, the top tube, and the down tube.

The frame shown in FIG. 1, generally indicated by numeral 10, is a typical bicycle frame which is one embodiment incorporating the present invention. The joint of interest is the head tube junction 12 formed between a top tube 14, a down tube 16, and a head tube 18. In this particular embodiment of the invention, the top tube 14 and the down tube 16 include sections 15, 17 of a round cross-sectional shape connected at the end 20, 22 to a seat tube 24 respectively. The top tube 14 and the down tube 16 further include sections 19, 21 of a rectangular cross-sectional shape which taper from the round cross-sectional shape of the sections 15, 17 to the ends 26, 28 connected to the head tube 18 respectively. In addition, the edges 30 of the rectangular sections 19, 21 of the top tube 14 and the down tube 16 are rounded, and the surfaces 32 of the sections 19, 21 of the tubes are not perfectly flat, as shown in FIG. 2. Although the invention is not limited to such tubes, the method described is particularly applicable to these types of non-standard tapering tubes because of their varying cross-sectional shape.

As more clearly shown in FIG. 2, the end 26 of the top tube 14 has an edge 34 formed at a first predetermined angle with respect to a centre longitudinal axis of the top tube 14. The edge 34 conforms to and abuts a portion of the external periphery of the head tube 18 when the top tube 14 is mitered to the head tube 18 at the first predetermined angle. Similarly, the end 28 of the down tube 16 has an edge 36 which is formed at a second predetermined angle with respect to the central longitudinal axis of the down tube 16. The edge 36 is provided to conform to and abut a portion of the external periphery of the head tube 18 when the down tube is mitered to the head tube 18 at the second predetermined angle. Even though the top tube 14 and down tube 16 have a non-standard rectangular shape, the edges 34 and 36 are easily accomplished through the use of a hole saw or a similar cutting procedure because the head tube 18 has a standard cylindrical shape.

The top tube 14 and the down tube 16 are mitered to the head tube 18 at an axial position on the head tube 18 so that the top tube 14 and the down tube 16 are also mitered to one another at the respective ends 26, 28. The traditional method of accomplishing the required connection is by overlapping of the top tube 14 and down tube 16. The overlap requires that a cut edge of one of the top and down tubes 14, 16 matches the surface of the other of the top and down tubes 14, 16. However, because of the rounded edges 30, non-flat surfaces 32, and tapered nature of the rectangular sections 19, 21 of the top and down tubes in this embodiment, such miter would be too complicated and cannot be achieved with traditional methods.

Therefore, the preferred method of mitering for situations similar to the one demonstrated by this particular embodiment is described below. Through this method, the mitering of the top and down tubes 14, 16 through the overlap is otherwise accomplished with a simple miter that does not require any special equipment, and the resulting joint provides advantages in terms of a better fit up, strength, and aesthetic appearance.

A portion of the wall of the top tube 14 at the end 26 is cut in a plane along straight line 38 intersecting the top tube 14 to form flat abutting surfaces 40 at both intersected wall segments. Similarly, a portion of the wall of the down tube 16 at the end 28 is cut in a plane along a straight line 42 to form flat abutting surfaces 44 which mate the abutting surfaces 40 when the top tube 14 and the down tube 16 are mitered to one another. This cutting can be very simply accomplished through the use of a cut-off saw or the like. The angle and location of the planes along lines 38, 42 can be chosen in a variety of ways. In the preferred embodiment, for best results to be accomplished, the height of the plane relative to the head tube junction 12 and the angle of the lines 38, 42 with respect to the respective central longitudinal axis of the top and down tubes 14, 16, are carefully chosen so that roughly equal amounts of the wall of the top tube 14 and the down tube 16 are cut off and a maximum contact area is achieved between the abutting surfaces 40, 44 of the top and down tubes 14, 16. In this embodiment, the angle and location were determined with the aid of a Computer Aided Design package to model the joint. Choosing the location and angle of the plane results in an abutting surface 40 roughly identical to the abutting surface 44. In this embodiment, for best results to be accomplished, the angle of the lines 38, 42 with respect to the respective central longitudinal axis of the top and down tubes 14, 16 is chosen so that roughly equal amounts of the wall of the top tube 14 and the down tube 16 are cut off. As a result, a maximum contact area is achieved between the abutting surfaces 40, 44 of the top and down tubes 14, 16 because the abutting surface 40 is roughly identical to the abutting surface 44.

It is noted that the cut edges 34, 36 at the respective ends 26, 28 are symmetric about the centre plane of the frame 10, and the abutting surface 40 and the abutting surface 44 are respectively formed in a plane orthogonal to the central plane of the frame 10 to ensure that the frame 10 is accurately aligned.

Figure 3:
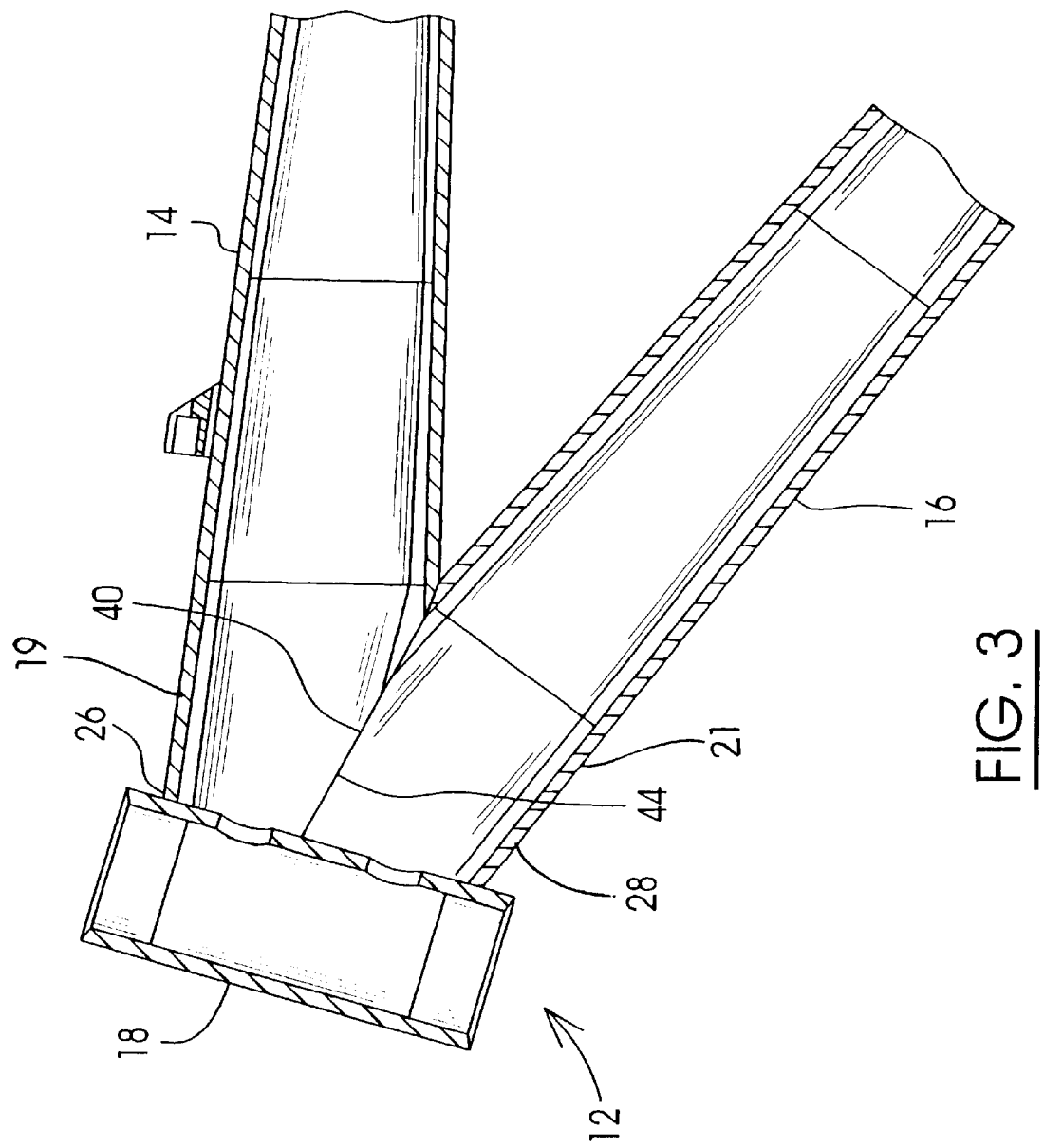
FIG. 3 is a side cross-sectional view of the head tube junction, taken through the centre plane of the bicycle frame in FIG. 1, showing the manner of assembly.

FIG. 3 shows a cross-section of the head tube junction 12 assembled together. When the top tube 14, down tube 16, and head tube 18 are prepared ready as shown in FIG. 2, the top and down tubes 14, 16 and the head tube 18 are placed together in such a manner that the respective top and down tubes 14, 16 are mitered to the head tube 18 at the first and second predetermined angles at an axial position on the head tube 18, in which position the abutting surfaces 40, 44 of the top and down tubes 14, 16 mate with each other. Then the head tube junction 12 is welded at interfaces between the wall of the head tubing 18 and the respective cut edges 34, 36 of the top and down tubes 14, 16. The mating abutting surfaces 40 and 44 are also welded together.

The rectangular sections 19, 21 of the top and down tubes 14, 16 at the head tube 18 result in significant strength advantages. Welds between two round tubes are problematic because cracks can initiate at stress points located at the crown and saddle points of the weld. The present embodiment of the invention using the rectangular sections 19, 21 of the top tube 14 and down tube 16 eliminates the stress risers in addition to allowing for significantly higher weld length between the top tube 14, the down tube 16, and the head tube 18. The stress is then distributed more evenly over this greater length of a weld, resulting in a stronger structure. The frame described is significantly stronger than a frame with round non-overlapping tubes.

In addition to a greater weld length between the top tube 14 and the head tube 18, the down tube 16 and the head tube 18, the mating abutting surfaces 40, 44 between the top tube 14 and down tube 16 also provides additional support for the head tube 18. In fact, the structure formed by the top and down tubes mitering together acts as a built-in gusset for the head tube 18. Because of the greater strength of the joint, the top tube 14 and the down tube 16 do not have to be as thick as they would for round tubes, which results in weight saving. In this embodiment, the wall thickness of the down tube 16 at the end 28 is 2.4 mm. The wall thickness of the top tube 14 at the end 26 is 1.9 mm. The head tube 18 is 4.0 mm thick. A similar embodiment with non-overlapping circular tubes having the same wall thickness would be significantly weaker.

For this particular embodiment, the top tube and down tube have a rectangular cross-sectional shape at the head tube. However, the invention is equally applicable to tubes of almost any constant or varying cross-sectional shape, such as tubes with aerodynamic shapes, oval tubes, and traditional round tubing, as long as the abutting surface of the top tube can mate up with the abutting surface of the down tube. The method applies equally well to aluminium tubing, steel tubing, or tubing made from any other material.

For this particular embodiment, the abutting surfaces 40, 44 of the top and down tubes 14, 16 are made from a simple straight cut. A straight cut is the easiest for manufacturing. However, the abutting surfaces of the top and down tubes are not necessarily restricted to being a straight cut. The abutting surfaces could also be a round cut, or almost any other shape, as long as abutting surface 40 of the top tube 14 matches the abutting surface 44 of the down tube 16.

The design can equally be applied to all types of bicycles, including, but not limited to, hardtail mountain bikes, full-suspension bikes, BMX bikes, and road bikes.

I claim:

1. A method of constructing a head tube junction of a bicycle frame including at least a head tube, a top tube, and a down tube, comprising steps of:

providing a top tube and a down tube, each having a first end, a second end, and an outer surface, and the outer surface bounding a transverse cross-sectional area at each first and second end, the transverse cross-sectional area at each first end being at least equal to the transverse cross-sectional area at each second end;

forming the first end of the top tube at a first predetermined angle with respect to a longitudinal axis of the top tube so that the top tube is enabled to be mitered to the head tube at the first predetermined angle;

forming the first end of the down tube at a second predetermined angle with respect to a longitudinal axis of the down tube so that the down tube is enabled to be mitered to the head tube at the second predetermined angle;

forming a portion of the wall of the top tube at the first end thereof to form an abutting surface, and forming a portion of the wall of the down tube at the first end thereof to form mating abutting surfaces in a common plane at an acute angle to the longitudinal axes of the top and down tubes; and fastening the head, top, and down tubes at the head tube junction at interfaces between the wall of the head tube and the respective first ends of the top and down tubes, and between the abutting surfaces of the top and down tubes along said common plane.

2. The method as claimed in claim 1, wherein the portions of the wall of the top tube and down tube are cut along a straight line in the common plane.

3. The method as claimed in claim 2, wherein the respective angles of the common plane with respect to the longitudinal axes of the top and down tubes are individually chosen so that substantially equal amounts of the wall of the top and down tubes are cut off.

4. A top tube and down tube used for carrying out the method according to claim 1, characterized in that the transverse cross-sectional area at the first end of at least one of the top and down tubes is larger than the transverse cross-sectional area at the corresponding second end.

5. A top tube and a down tube according to claim 4, characterized in that each of the first and second ends have a different transverse cross-sectional shape.

6. The method as defined in claim 1, wherein the step of forming includes cutting the walls and the step of fastening comprises welding.

7. The method as claimed in claim 6, comprising before the fastening step a further step of:

mitering the respective top and down tubes to the head tube at the first and second predetermined angles at an axial position on the head tube so that the abutting surfaces thereof mate with each other.

8. The method as claimed in claim 1, wherein the step of forming a portion of a wall of the top tube and down tube at first ends thereof, further includes conforming the first ends to a portion of an external periphery of a wall of the head tube.

9. The method as claimed in claim 7, wherein the head tube has a round transverse cross-section, and each of the first ends of the top and down tubes is formed using a hole saw.

10. The method in claim 1, further including ensuring an edge of the first end of each of the top and down tubes is symmetric about a central plane f the bicycle frame.

11. The method as claimed in claim 2, further including forming the abutting surface of each of the top and down tubes in a plane orthogonal to a central plane of the bicycle frame.

12. A bicycle frame comprising:

at least a head tube, a top tube, a down tube, and a head tube junction formed therebetween;

the top tube having a first end formed at a first predetermined angle with respect to a longitudinal axis of the top tube, the first end having an edge conforming to and abutting a portion of an external periphery of a wall of the head tube, whereby the top tube is mitered to the head tube at the first predetermined angle;

the top tube having an outer surface bounding a transverse cross-sectional area, the transverse cross-sectional area at a second end of the tube being at most equal to the transverse cross-sectional area at the first end thereof;

the down tube having a first end formed at a second predetermined angle with respect to a longitudinal axis of the down tube, the first end having an edge conforming to and abutting a portion of the external periphery of the wall of the head tube, whereby the down tube is mitered to the head tube at the second predetermined angle;

the down tube having an outer surface bounding a transverse cross-sectional area, the transverse cross-sectional area at a second end of the tube being at most equal to the transverse cross-sectional area at the first end thereof; and a first abutting surface formed along a portion of a wall of the top tube at the first end thereof and a second abutting surface formed along a portion of a wall of the down tube at the first end thereof so that the abutting surfaces of the top and down tubes mate in a common plane at an acute angle to the longitudinal axes of the top and down tubes, to form the head tube junction.

13. The bicycle frame as claimed in claim 12, wherein the head tube is cylindrical, and each of the top and down tubes tapers from a round cross-sectional shape to a rectangular cross-sectional shape at the first end.

14. The bicycle frame as claimed in claim 12, wherein the abutting surface, in the common plane, of each of the top and down tubes is flat.

15. The bicycle frame as claimed in claim 12, wherein the portion of the wall of the top and down tubes is cut to an angle being chosen so that substantially equal amounts of the wall of the top and down tubes are cut off.

16. The bicycle frame as defined in claim 12, wherein the head tube junction is completed by a weld.

\* \* \* \* \*